United States Patent
Shimada et al.

(10) Patent No.: US 9,023,204 B2
(45) Date of Patent: May 5, 2015

(54) PURIFIER FOR REMOVING HYDROGEN FLUORIDE FROM ELECTROLYTIC SOLUTION

(75) Inventors: Yutaka Shimada, Minatu-Ku (JP); Yasushi Ohyashiki, Minatu-Ku (JP)

(73) Assignee: Entegris, Inc., Billerica, MA (US)

( * ) Notice: Subject to any disclaimer, the term of this patent is extended or adjusted under 35 U.S.C. 154(b) by 312 days.

(21) Appl. No.: 13/510,676

(22) PCT Filed: Dec. 16, 2010

(86) PCT No.: PCT/JP2010/072638
§ 371 (c)(1),
(2), (4) Date: Jun. 29, 2012

(87) PCT Pub. No.: WO2011/074631
PCT Pub. Date: Jun. 23, 2011

(65) Prior Publication Data
US 2012/0261328 A1  Oct. 18, 2012

(30) Foreign Application Priority Data

Dec. 17, 2009 (JP) ................................ 2009-286334

(51) Int. Cl.
*H01M 10/42* (2006.01)
*B01D 15/08* (2006.01)
(Continued)

(52) U.S. Cl.
CPC ............... *B01D 15/00* (2013.01); *B01D 24/00* (2013.01); *H01M 10/0525* (2013.01); *H01M 10/0566* (2013.01); *Y02E 60/122* (2013.01); *Y10S 210/915* (2013.01)

(58) Field of Classification Search
CPC ............. B01D 24/10; H01M 10/0566; H01M 10/0525; Y02E 60/122
USPC ............. 210/259, 283, 284, 289, 502.1, 683, 210/684, 689, 915; 429/72, 80, 188, 189, 429/199, 410, 414
See application file for complete search history.

(56) References Cited

U.S. PATENT DOCUMENTS 4,726,818 A * 2/1988 Yeung et al. ................. 95/124
6,001,325 A 12/1999 Salmon et al.
(Continued)

FOREIGN PATENT DOCUMENTS

CN  1588687  3/2005
CN  101252209  8/2008
(Continued)

OTHER PUBLICATIONS

Notification of Transmittal of the International Search Report and Written Opinion of the International Searching Authority from counterpart International Application No. PCT/JP2010/072638, "Purifier for Removing Hydrogen Fluoride From Electrolytic Solution", dated Jun. 28, 2012 (English translation).
(Continued)

*Primary Examiner* — Matthew O Savage
(74) *Attorney, Agent, or Firm* — Hamilton, Brook, Smith & Reynolds, P.C.

(57) ABSTRACT

The present invention is a purification system for removing hydrogen fluoride and water from an electrolytic solution for lithium-ion secondary batteries in which [1] a purifier for removing hydrogen fluoride containing a hydrogen fluoride adsorbent selected from among carbonate hydrotalcites and calcined hydrotalcites and [2] a purifier for removing water containing an adsorbent for trapping water are connected in this order from upstream to downstream.

9 Claims, 1 Drawing Sheet

(51) Int. Cl.
  *B01D 15/00* (2006.01)
  *H01M 10/0525* (2010.01)
  *H01M 10/0566* (2010.01)
  *B01D 24/00* (2006.01)

(56) References Cited

U.S. PATENT DOCUMENTS

| | | | |
|---|---|---|---|
| 6,033,808 A | 3/2000 | Salmon et al. | |
| 6,358,895 B1 * | 3/2002 | Phillips | 508/433 |
| 2008/0206636 A1 | 8/2008 | Sanada et al. | |

FOREIGN PATENT DOCUMENTS

| | | | | |
|---|---|---|---|---|
| JP | 11-073999 | | 3/1999 | |
| JP | 2000-505042 A | | 4/2000 | |
| JP | 2001-269664 A | | 10/2001 | |
| JP | 2001269664 A | | 10/2001 | |
| JP | 2003323916 A | * | 11/2003 | H01M 10/40 |
| JP | 2008-235255 A | | 10/2008 | |
| JP | 2008-262859 | | 10/2008 | |
| JP | 2008235255 A | | 10/2008 | |
| WO | WO 98/23536 | | 6/1998 | |

OTHER PUBLICATIONS

Written Opinion of the International Searching Authority, PCT/JP2010/072638, "Purifier for Removing Hydrogen Fluoride From Electrolytic Solution", mailed Feb. 1, 2011 (English translation).

International Search Report, dated Feb. 1, 2011, for International Application No. PCT/JP2010/072638.

Communication enclosing Supplementary European Search Report, Issued in European Application No. EP 10837656, entitled "Purifier for Removing Hydrogen Fluoride From Electrolytic Solution," Dated: Aug. 19, 2014.

Search Report, Issued in Chinese Application No. 201080056990.0, entitled "Purifier for Removing Hydrogen Fluoride From Electrolytic Solution," Date of Notification: Feb. 26, 2014.

* cited by examiner

| | |
|---|---|
| 101, 203 | Purifier For Removing Hydrogen Fluoride |
| 103, 205 | Purifier For Removing Water |
| 201 | Preliminary Purifier For Removing Water |

PURIFIER FOR REMOVING HYDROGEN FLUORIDE FROM ELECTROLYTIC SOLUTION

TECHNICAL FIELD

The present invention relates to a purification system used in the manufacturing process for a non-aqueous electrolytic solution for use in a lithium ion secondary battery and in the manufacturing process for a lithium ion secondary battery and, more specifically, to a purification system for removing hydrogen fluoride and water by passing a hydrogen fluoride-containing non-aqueous electrolytic solution for a lithium secondary battery through the purification system.

RELATED APPLICATIONS

This application is the U.S. National Stage of International Application No. PCT/JP2010/072638, filed Dec. 16, 2010, which designates the U.S., published in Japanese, and claims priority under 35 U.S.C. §119 or 365(c) to Japanese Application No. 2009-286334 filed in Dec. 17, 2009. The entire teachings of the above applications are incorporated herein by reference.

BACKGROUND ART

A lithium-ion secondary battery has a structure in which a positive electrode material applied to aluminum foil and a negative electrode material applied to copper foil face each other via an insulating porous polyethylene film so as not to make electrical contact, and the interior space is filled with an electrolytic solution in which a non-aqueous electrolyte such as a carbonate ester and additives have been dissolved. Fluoride-based electrolytes with good characteristics in terms of conductivity, potential window, and interaction with metals are often used as electrolytes in lithium-ion secondary batteries. However, hydrolysis of these fluorides releases hydrogen fluoride, and this hydrogen fluoride dissolves the electrode materials and corrodes the current collector. These problems cause battery performance to deteriorate.

In order to address these problems, the conventional method is to prevent contamination by water in the manufacturing process, thereby inhibiting the hydrolysis of fluoride-based electrolytes. However, it is difficult to completely prevent contamination by water in the manufacturing process using the conventional method, so the creation of hydrogen fluoride in the electrolytic solution cannot be completely prevented. In addition to during manufacture of the electrolytic solution, water contamination is also known to occur during shipment of the electrolyte and during manufacture of batteries. In order to reduce contamination by water, manufacturing has to be performed in a controlled environment where humidity is reduced such as in a dry room, and this increases production costs.

In order to prevent hydrogen fluoride generated by hydrolysis from adversely affecting a non-aqueous electrolyte, the inclusion of a compound for adsorbing hydrogen fluoride in the electrolyte and/or electrode materials has been proposed. Among these, synthetic hydrotalcites known as intercalated materials (Patent Document 1) and organically synthesized hydrotalcites (Patent Document 2) have been proposed as superior hydrogen fluoride removing materials. These hydrotalcite compounds have a layered structure, and act to adsorb and fix hydrogen fluoride molecules and sometimes water molecules between layers.

PRIOR ART REFERENCES

Patent References

Patent Reference 1: Japanese Published Unexamined Patent Application No. 11-73999
Patent Reference 2: Japanese Published Unexamined Patent Application No. 2008-262859

DISCLOSURE OF THE INVENTION

Problems to be Solved by the Invention

As described above, because contamination of a non-aqueous electrolyte by water cannot be sufficiently prevented in a lithium-ion secondary battery of the prior art, a material for adsorbing hydrogen fluoride has been mixed into the electrolyte solution. When a material for adsorbing hydrogen fluoride is mixed into the electrode material, the per-weight amount of electrode active material is reduced in proportion to the amount mixed in. As a result, the initial discharge capacity of the lithium-ion secondary battery is limited.

A purpose of the present invention is to increase the performance of an electrolyte included in a lithium-ion secondary battery by sufficiently reducing the amount of water and hydrogen fluoride in the electrolytic solution during the manufacturing process, and to improve the longevity of a lithium-ion secondary battery without adding a hydrogen fluoride adsorbent to the battery, which adversely affects performance such as discharge capacity.

Means for Solving the Problems (1) The present invention provides a purification system in which a purifier for removing hydrogen fluoride, which contains a synthetic hydrotalcite, and a purifier for removing water, which contains a water adsorbent, are connected in this order from upstream to downstream.

A purifier for removing water is used downstream in order to remove the water generated, for example, when an exchange reaction occurs between carbonic acid ions from the synthetic hydrotalcite and hydrogen fluoride.

(2) The present invention also provides a purification system according to (1) in which a preliminary purifier for removing water is connected upstream from the purifier for removing hydrogen fluoride.

A preliminary purifier for removing water is used downstream in order to prevent hydrolysis of the solvent in the electrolytic solution when the electrolytic solution contains a large amount of water. A preliminary purifier for removing water does not have to be used when the electrolytic solution contains a small amount of water.

The purification systems according to (1) and (2) can consist of individual purifiers, or can be an integrated purification in which a single housing is divided in the order described above into a plurality of purifiers containing different adsorbents.

These synthetic hydrotalcites include carbonate hydrotalcites and calcined hydrotalcites in which a carbonate hydrotalcite is calcined at 500° C. and decarboxylated. When the initial concentration of hydrogen fluoride in the electrolytic solution is set at 30 ppmw (parts per million weight) using this type of synthetic hydrotalcite, one gram of carbonate hydrotalcite can reduce the concentration of hydrogen fluoride to 5 ppmw, preferably 1 ppmw, and more preferably 0.5 ppmw. This can prepare an electrolytic solution required in a lithium-ion secondary battery (including a lithium compound electrolyte and a solvent). When combined with a purifier for removing water, the moisture (water) can be reduced to 10 ppmw or less.

Effect of the Invention

The present invention can reduce the hydrogen fluoride in an electrolytic solution which is difficult to reduce using moisture controls alone. Because the hydrogen fluoride can be reduced in the final step of the manufacturing process, the burden associated with moisture control can be reduced which leads to lower manufacturing costs.

When a purifier for reducing hydrogen fluoride with the configuration described above, and a purification system with this purifier for reducing hydrogen fluoride and a purifier for reducing water are used, sufficient hydrogen fluoride reduction and water reduction can be performed. Also, a material for removing hydrogen fluoride does not have to be mixed into the electrolytic solution in the lithium-ion secondary battery, and a long-lasting lithium-ion secondary battery can be provided.

BEST MODE FOR CARRYING OUT THE INVENTION

Figure 1:
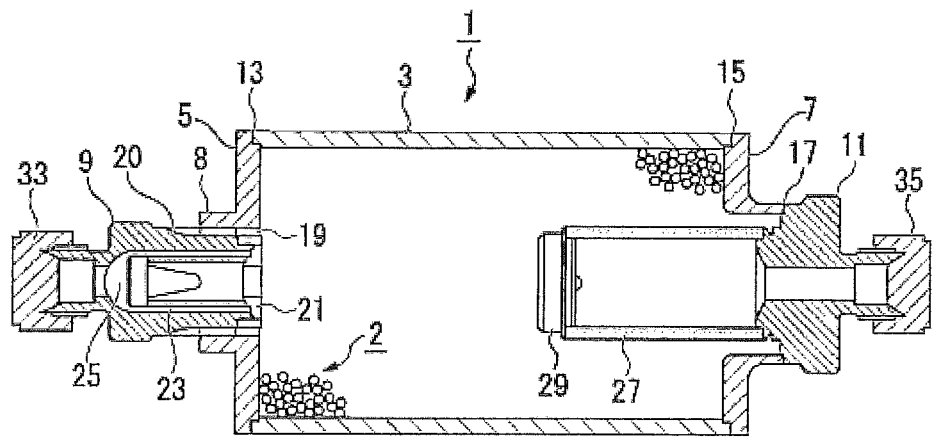
FIG. 1 is a cross-sectional view showing an example of a purifier that can be used in the present invention.

In the present invention, a fluorine-containing lithium salt is used as the electrolyte in the non-aqueous electrolytic solution containing water to be purified. Examples of these lithium salts, as mentioned in Patent Document 2, include $LiPF_6$, $LiBF_4$, $LiAsF_6$, $LiSbF_6$, $LiCF_3SO_3$, $LiC_2F_5SO_3$, $LiC_4F_9SO_3$, $LiN(CF_3SO_2)_2$, $LiN(C_2F_5SO_2)_2$, $LiC(CF_3SO_2)_3$, and $LiPF_2\{(COO)_2\}_2$. Because $LiPF_6$, $LiBF_4$, $LiAsF_6$, and $LiSbF_6$ are prone to causing hydrolysis, electrolytic solutions containing any one of them are purified by the purification system of the present invention before incorporation into a lithium battery, and the hydrogen fluoride generated by hydrolysis in the presence of water is removed.

Examples of organic solvents that can be used to dissolve the electrolyte include dimethyl carbonate (DMC), diethyl carbonate (DEC), methyl ethyl carbonate (MEC), ethylene carbonate (EC), propylene carbonate (PC), and mixtures of any of these. Preferably, the organic solvent used to dissolve the electrolyte is a mixture of these carbonate esters.

A number of adsorbents able to remove water from an electrolyte are known, including activated alumina and synthetic zeolite. The appropriate one can be selected and used. Because water occurs in the purifier for removing hydrogen fluoride of the present invention when metal fluorides are generated by reactions between hydrogen fluorides and metal hydroxides or metal oxides, and when a synthetic hydrotalcite causes a substitution reaction between hydrogen fluoride and carbonic acid ions, the byproduct water has to be removed by a purifier for removing water after the electrolytic solution has been purified by a purifier for removing hydrogen fluoride containing a synthetic hydrotalcite.

Preferably, the water is removed using an adsorbent similar to one able to adsorb water in a non-aqueous electrolyte, even when upstream from the purifier for removing hydrogen fluoride.

The synthetic hydrotalcite used in the present invention can be intercalated carbonic acid ions, or a carbonate hydrotalcite that is calcined at 500° C. or above and decarboxylated. These have good hydrogen fluoride adsorption performance, but the calcined ones are better because they generate less water as a byproduct. Carbonate hydrotalcite is represented by the structural formula $[M^{2+}_{1-x}M^{3+}_x(OH)_2]^{x+}[(CO_3)_{x/2}\cdot mH_2O]^{x-}$ (m≥0, where m depends on the processing temperature), and calcined hydrotalcite is represented by the structural formula $M^{2+}_{1-x}M^{3+}_xO_{1+x/2}$ (where $0<x\leq0.33$, $M^{2+}$ is divalent Mg, Mn, Fe, Co, Ni, Cu or Zn metal ions, and $M^{3+}$ is trivalent Al, Fe, Cr, Co or In metal ions.) In particular, one represented by the structural formula $[Mg_{1-x}Al_x(OH)_2]^{x+}[(CO_3)_{x/2}\cdot mH_2O]^{x-}$, or $Mg_{1-x}Al_xO_{1+x/2}$ can be used. Here, $Mg_{1-x}Al_x(OH)_2$ is a metal hydroxide sheet, and $CO_3$ represents interlayer ions. Examples of carbonate hydrotalcites that can be used include the Kyowaad 500 Series (Kyowa Chemical Industry Co., Ltd.) and examples of calcined hydrotalcites that can be used include the KW2000 Series (Kyowa Chemical Industry Co., Ltd.). Among these synthetic hydrotalcites, the carbonate hydrotalcites are able to fix hydrogen fluoride by exchanging carbonic acid ions and fluoride ions, and the calcined hydrotalcites are able to fix hydrogen fluoride by adsorbing hydrogen fluoride. These materials can also adsorb water molecules, but this is less effective than adsorption of hydrogen fluoride. Therefore, a separate adsorbent for removing water is used in the present invention to remove water.

The purifier for removing hydrogen fluoride has mesh for preventing outflow of the adsorbent at both ends of a cylindrical housing packed with a granular hydrogen fluoride adsorbent, and the mesh is attached with screw fittings to the inlet and outlet for the electrolytic solution. Any purifier for removing water can be used. One whose structure is similar to that of the purifier for removing hydrogen fluoride can also be used.

An adsorber is illustrated in FIG. 1. Simply stated, the purifier 1 contains adsorbent particles 2 of a synthetic hydrotalcite serving as the hydrogen fluoride adsorbent. The purifier 1 has a cylindrical body 3 made of an inactive material such as stainless steel or a synthetic resin, disc-shaped end plates 5, 7 provided on both ends of the body, and an electrolytic solution inlet member 9 and an electrolytic solution outlet member 11 passing through these end plates. The connections 13, 15 between the body 3 and the end plates 5, 7, and the connection 17 between the end plate 7 and the outlet member 11 are welded to make the entire structure liquid-tight. Because an opening has to be formed in the connection between the end plate 5 and the electrolytic solution inlet member 9 to add or replace adsorbent particles, an internal thread 19 is formed on the inner circumferential surface of the opening 8 in the end plate 5, and an external thread 20 is formed on the outer circumferential surface of the inlet member 9. A ring-shaped support member 21 is welded or screw-fastened to the inner end of the inlet member 9. A ceramic or, preferably, metal perforated cylinder 23 is welded or screw-fastened to the support member 21, and the perforated cylinder 23 is closed by welding or fastening a cap 25 with screws. Similarly, a ceramic or, preferably metal perforated cylinder 27 is welded or screw-fastened to the inner end of the outlet member 11, and the perforated cylinder 27 is closed by a cap 29. The cap can be fixed to the perforated cylinder 27 using screws or any other method. The upstream perforated cylinder 23 can have relatively large pores, but the downstream perforated cylinder 27 has to have relatively fine pores so that the adsorbent particles do not pass through. Before use, the unit is closed by screwing a cap 33 into the inlet member 9 and screwing a cap 35 into the outlet member 11.

Instead of this structure, an integrated structure can be used in which the same housing is partitioned into two or three sections by perforated partition walls, and the sections are charged with two or three types of adsorbent as described in paragraphs [0010] to [0014] of U.S. Patent Application Publication No. US 2012/0261328.

Figure 2:
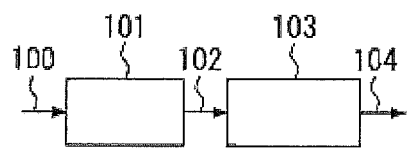
FIG. 2 shows the configurations of purification systems in embodiments of the present invention, in which (a) is a first embodiment, and (b) is a second embodiment.
Figure 2:
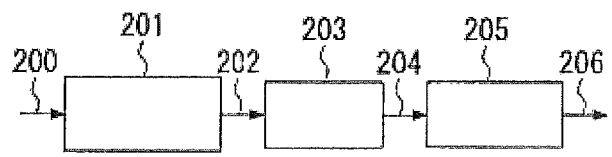

FIG. 2 (a) illustrates a purification system according to a first embodiment of the present invention. A purification system is provided in which an electrolytic solution inlet 100, a purifier for removing hydrogen fluoride 101 containing a synthetic hydrotalcite, a connector pipe 102, a purifier for removing water 103 containing an adsorbent for trapping water such as synthetic zeolite, and a purified electrolytic solution outlet 104 are connected in this order from upstream to downstream.

FIG. 2 (b) illustrates a purification system according to a second embodiment of the present invention. A purification system is provided in which an electrolytic solution inlet 200, a preliminary purifier for removing water 201 containing an adsorbent for trapping water, a connector pipe 202, a purifier for removing hydrogen fluoride 203 containing a synthetic hydrotalcite, a connector pipe 204, a purifier for removing water 205 containing an adsorbent for trapping water such as synthetic zeolite, and a purified electrolytic solution outlet 206 are connected in this order from upstream to downstream.

EMBODIMENTS

Removal of Water

Experiments were performed to demonstrate the effect of the present invention. Experiments were performed to remove the moisture (water) using toluene and dimethyl carbonate, which is utilized as the solvent for the electrolyte in a lithium secondary battery.

Experiment 1

10 g dimethyl carbonate (DMC) and 1 g of granular activated alumina (AA-300 Series from DK Fine Co., Ltd., 8×14 mesh particle size) were added to a brown bottle with a lid, and a variable amount of deionized water (ultrapure water) was also added. After being allowed to stand for 19 hours, the concentration of water in the dimethyl carbonate was measured using a Karl Fischer moisture meter (CA 06 manufactured by Mitsubishi Chemical Co., Ltd.). The sample formulations and measurement results are shown in Table 1.

Experiment 2

10 g dimethyl carbonate (DMC) and 1 g of granular zeolite (MS) (Molecular Sieve 3A from Union Showa Co., Ltd., 14×30 mesh particle size) were added to a brown bottle with a lid, and a variable amount of deionized water (ultrapure water) was also added. After being allowed to stand for 19 hours, the concentration of water in the dimethyl carbonate was measured using a Karl Fischer moisture meter. The sample formulations and measurement results are shown in Table 2.

Experiment 3

10 g toluene and 1 g of granular zeolite (MS) (Molecular Sieve 3A from Union Showa Co., Ltd., 14×30 mesh particle size) were added to a brown bottle with a lid, and a variable amount of deionized water (ultrapure water) was also added. After being allowed to stand for 19 hours, the concentration of water in the dimethyl carbonate was measured using a Karl Fischer moisture meter. The sample formulations and measurement results are shown in Table 3.

TABLE 1

Results of Experiment Adsorbing Water Using Activated Alumina

| Sample | DMC (g) | Alumina (g) | Water (g) | Water/Absorbent (%) | Final Water ppmw |
|---|---|---|---|---|---|
| A0 | 10.0 | 1.0 | 0.00 | 0.0 | 20 |
| A1 | 10.0 | 1.0 | 0.20 | 2.0 | 60 |
| A2 | 10.0 | 1.0 | 0.50 | 5.0 | 850 |
| A3 | 10.0 | 1.0 | 0.10 | 10.0 | 3200 |

TABLE 2

Results of Experiment Adsorbing Water Using Synthetic Zeolite

| Sample | DMC (g) | Alumina (g) | Water (g) | Water/Absorbent (%) | Final Water ppmw |
|---|---|---|---|---|---|
| MS0 | 10.0 | 1.0 | 0.00 | 0.0 | 5 |
| MS1 | 10.0 | 1.0 | 0.02 | 2.0 | 9 |
| MS2 | 10.0 | 1.0 | 0.05 | 5.0 | 4 |
| MS3 | 10.0 | 1.0 | 0.10 | 10.0 | 20 |
| MS4 | 10.0 | 1.0 | 0.15 | 15.0 | 280 |
| MS5 | 10.0 | 1.0 | 0.20 | 20.0 | 5000 |
| MS6 | 10.0 | 1.0 | 0.25 | 25.0 | 5000 |

TABLE 3

Results of Experiment Adsorbing Water Using Synthetic Zeolite

| Sample | DMC (g) | Alumina (g) | Water (g) | Water/Absorbent (%) | Final Water ppmw |
|---|---|---|---|---|---|
| MS7 | 10.0 | 1.0 | 0.00 | 0.0 | 1 |
| MS8 | 10.0 | 1.0 | 0.02 | 2.0 | 0.3 |
| MS9 | 10.0 | 1.0 | 0.05 | 5.0 | 0.6 |
| MS10 | 10.0 | 1.0 | 0.10 | 10.0 | 0.7 |
| MS11 | 10.0 | 1.0 | 0.15 | 15.0 | 2 |
| MS12 | 10.0 | 1.0 | 0.20 | 20.0 | 190 |
| MS13 | 10.0 | 1.0 | 0.25 | 25.0 | 510 |

Because a normal electrolyte (a fluorine-containing electrolyte dissolved in an organic solvent) contains 10-100 ppmw water in the manufacturing stage, the purpose of the present invention can be achieved if the water content is reduced to 100 ppmw or less by the preliminary purifier for removing water which is installed upstream from the purifier for removing hydrogen fluoride. It can also be achieved if the water content is reduced to 10 ppmw or less by the purifier for removing water which is installed downstream from the purifier for removing hydrogen fluoride. As shown in Table 1 through Table 3, the results obtained in this experiment were satisfactory.

Removal of Hydrogen Fluoride

Experiments were performed to demonstrate the effect of the present invention.

Experiment 4

50 μL of hydrofluoric acid with a fluoride ion concentration of 2,000 ppmw was added to 10 g of dimethyl carbonate (DMC), and a DMC solution with a fluoride ion concentration of 10 ppmw was prepared. One gram of carbonate hydrotalcite (HTS) (Kyowaad 500SN) was added to this as the adsorbent, and the contents were shaken. One hour after adding the adsorbent, the solution was diluted by a factor of 100 using ultrapure water, and the fluoride ion concentration was measured using ion chromatography. The results are shown in Table 4. In a first comparative example, 5 g of activated alumina (AA-300 Series from DK Fine Co., Ltd., 8×14 mesh particle size) was added to a DMC solution prepared in the same way. The results are shown in Table 4. In a second comparative example, an adsorbent was not added to a DMC solution which was otherwise prepared in the same way. After allowing the solution to stand for an hour, the fluoride ion concentration was measured. These results are also shown in the table.

TABLE 4

|  | DMC (g) | Activated Al (g) | HTS (g) | Fluoride Ions After 1 Hour ppmw |
|---|---|---|---|---|
| Ex. | 10.0 | — | 1.0 | 0.5 |
| Comp. Ex. 1 | 10.0 | 5.1 | — | 3.1 |
| Comp. Ex. 2 | 10.0 | — | — | 8.9 |

From this experiment, when a carbonate hydrotalcite is used as an adsorbent, results are obtained under the conditions described above in which the hydrogen fluoride concentration is reduced to 0.5 ppmw or less. However, the concentration can only be reduced to approximately 3 ppmw using activated alumina, even when approximately 5 g of activated alumina are used.

Next, in order to confirm the effect of the present invention under conditions similar to actual use, an experiment was conducted to remove hydrogen fluoride and water using a test filter.

Removal of Hydrogen Fluoride

Experiment 5

1.4 g of synthetic hydrotalcite (KW2000 Series from Kyowa Chemical Industry Co., Ltd.) was packed into a stainless steel column with an internal volume of 3.4 mL, and a test filter was prepared. Immediately after unsealing the column, an electrolytic solution for a lithium-ion secondary battery having a hydrogen fluoride concentration of 26 ppmw (LBG-96533 from Kishida Chemical Co., Ltd.) was supplied at a flow rate of 1 mL per minute. The fluoride ion concentration in the electrolytic solution passed through the filter was measured using an ion chromatograph spectrometer (Dionex DX 120). The results of the measurement are shown in Table 5.

TABLE 5

Results of Experiment Removing Hydrogen Fluoride From Electrolytic Solution Using Synthetic Hydrotalcites Immediately After Unsealing

| Amt. of Fluid mL | Fluoride Ions ppmw | Removal Rate % |
|---|---|---|
| 6 | <10 | >62 |
| 12 | <10 | >62 |
| 23 | <10 | >62 |
| 33 | <10 | >62 |
| 48 | <10 | >62 |
| 64 | <10 | >62 |
| 79 | <10 | >62 |
| 94 | <10 | >62 |
| 110 | <10 | >62 |
| 125 | <10 | >62 |
| 140 | <10 | >62 |

While the electrolytic solution was being supplied to the test filter, the fluoride ion concentration was measured each time the amount of fluid (i.e., the amount of electrolyte solution passed through the test filter) reached one of the values shown in Table 5. In all of the experiment results, the fluoride ion concentration in the electrolytic solution passed through the test filter was less than 10 ppmw. Thus, the test filter had a significant hydrogen fluoride removing effect on an electrolytic solution having a low initial fluoride ion concentration.

Next, a hydrogen fluoride removal test was performed using an electrolytic solution containing a higher hydrogen fluoride concentration due to deterioration.

Experiment 6

1.4 g of synthetic hydrotalcite (KW2000 Series from Kyowa Chemical Industry Co., Ltd.) was packed into a stainless steel column with an internal volume of 3.4 mL, and a test filter was prepared. Immediately after unsealing the column, an electrolytic solution for a lithium-ion secondary battery having a higher hydrogen fluoride concentration of 240 ppmw due to deterioration (LBG-96533 from Kishida Chemical Co., Ltd.) was supplied at a flow rate of 1 mL per minute. The fluoride ion concentration in the electrolytic solution passed through the filter was measured using an ion chromatograph spectrometer (Dionex DX 120). The results of the measurement are shown in Table 6.

TABLE 6

Results of Experiment Removing Hydrogen Fluoride From Electrolytic Solution Using Synthetic Hydrotalcites

| Amt. of Fluid mL | Fluoride Ions ppmw | Removal Rate % |
|---|---|---|
| 5 | 17 | 93 |
| 20 | 18 | 93 |
| 40 | 19 | 92 |
| 60 | 20 | 92 |
| 80 | 17 | 93 |
| 100 | 19 | 92 |
| 121 | 22 | 91 |

By passing the fluid through the test filter of the present application, a hydrogen fluoride removal rate exceeding 90% was obtained even when an electrolytic solution having a high initial fluoride ion concentration was used. Here, the hydrogen fluoride removal rate was calculated using the following equation.

$$(1-(x/y)) \times 100$$

x: Fluoride ion concentration in an electrolytic solution passed through a filter (ppmw)
y: Initial fluoride ion concentration in the electrolytic solution (i.e., 240 ppmw)

Removal of Water

A water removal test was performed using the test filter in the same manner as Experiment 5 and Experiment 6.

Experiment 7

2 g of synthetic zeolite (Tosoh Co., Ltd.) was packed into a stainless steel column with an internal volume of 3.4 mL, and a test filter was prepared. Also, an electrolytic solution for a lithium-ion secondary battery (LBG-96533 from Kishida Chemical Co., Ltd.) was supplied at a flow rate of 1 mL per minute. While continuing to supply the electrolytic solution, a small amount of water was gradually added to the electrolytic solution immediately before entering the test filter, and the water concentration at the inlet and the outlet of the test filter was measured using a Karl Fischer moisture meter (CA-06 from Mitsubishi Chemical).

TABLE 7

Results of Experiment Removing Water From Electrolytic Solution Using Synthetic Hydrotalcites

| Amt. of Fluid mL | Inlet Water Conc. ppmw | Outlet Water Conc. ppmw | Removal Rate % |
|---|---|---|---|
| 5 | 7 | 2 | 65 |
| 16 | 7 | 2 | 67 |
| 33 | 8 | 2 | 77 |
| 49 | 14 | 2 | 83 |
| 65 | 25 | 2 | 91 |
| 82 | 38 | 3 | 93 |
| 98 | 54 | 3 | 94 |
| 115 | 92 | 6 | 94 |
| 131 | 116 | 8 | 93 |

While the electrolytic solution was being supplied to the test filter, the water concentrations at the inlet and the outlet were measured each time the amount of fluid reached one of the values shown in Table 7. In all of the experiment results, the water concentration in the electrolytic solution at the outlet was less than 10 ppmw. It is clear that water was sufficiently removed from the electrolytic solution.

As explained above, the present invention is a purification system in which a purifier for removing hydrogen fluoride and a purifier for removing water are connected in this order from upstream to downstream. From the results of Experiment 7, it is clear that water can be effectively removed by a purifier for removing water that is installed downstream. Therefore, the present invention can reduce the water content of the electrolytic solution to less than 10 ppmw at the outlet of the purification system even when water is a byproduct of the purifier for removing hydrogen fluoride.

Key to the Drawings

1 Purifier
2 Adsorbent Particles
3 Cylindrical Body
5, 7 End Plate
8 Opening
9 Electrolytic Solution Inlet Member
11 Electrolytic Solution Outlet Member
13, 15, 17 Connection
19 Internal Thread
20 External Thread
21 Support Member
23, 27 Perforated Cylinder
25, 29, 33, 35 Cap
100 Electrolytic Solution Inlet
101 Purifier For Removing Hydrogen Fluoride
102 Connector Pipe
103 Purifier For Removing Water
104 Purified Electrolytic Solution Outlet
200 Electrolytic Solution Inlet
201 Preliminary Purifier For Removing Water
202 Connector Pipe
203 Purifier For Removing Hydrogen Fluoride
204 Connector Pipe
205 Purifier For Removing Water
206 Electrolytic Solution Outlet

The invention claimed is:

1. A purification system for removing hydrogen fluoride and water from a non-aqueous electrolytic solution for a lithium ion secondary battery, comprising:
   a purifier for removing hydrogen fluoride containing an adsorbent selected from carbonate hydrotalcites or calcined hydrotalcites; and
   a purifier for removing water connected downstream from the purifier for removing hydrogen fluoride, the purifier for removing water containing a water adsorbent,
   each purifier comprising a housing, an electrolytic solution inlet member, an electrolytic solution outlet member and mesh for preventing outflow of the adsorbent at the inlet and outlet of the housing,
   wherein the non-aqueous electrolytic solution flows into the purifier for removing hydrogen fluoride via the electrolytic solution inlet member of the purifier for removing hydrogen fluoride, whereby the non-aqueous electrolytic solution is supplied to the adsorbent selected from carbonate hydrotalcites or calcined hydrotalcites; out of the purifier for removing hydrogen fluoride via the electrolytic solution outlet member of the purifier for removing hydrogen fluoride; into the purifier for removing water via the electrolytic solution inlet member of the purifier for removing water, whereby the non-aqueous electrolytic solution is supplied to the water adsorbent; and out of the purifier for removing water via the electrolytic solution outlet member of the purifier for removing water.

2. The purification system according to claim 1, wherein the purifier for removing hydrogen fluoride reduces a concentration of hydrogen fluoride contained in a non-aqueous electrolytic solution for a lithium ion secondary battery to less than 10 ppmw.

3. The purification system according to claim 1, wherein the purifier for removing hydrogen fluoride attains a removal rate of the hydrogen fluoride of 90% or more.

4. The purification system according to claim 1, wherein the purifier for removing water reduces a concentration of water contained in a non-aqueous electrolytic solution for a lithium ion secondary battery to 10 ppmw or less.

5. The purification system according to claim 1, wherein the adsorbent contained in the purifier for removing hydrogen fluoride is a carbonate hydrotalcite which has a formula, $[M^{2+}_{1-x}M^{3+}_{x}(OH)_2]^{x+}[(CO_3)_{x/2}.mH_2O]^{x-}$ (m≥0) where 0<x≤0.33, $M^{2+}$ are divalent Mg, Mn, Fe, Co, Ni, Cu and Zn metal ions, and $M^{3+}$ are trivalent Al, Fe, Cr, Co and In metal ions.

6. The purification system according to claim 1, wherein the adsorbent contained in the purifier for removing hydrogen fluoride is a calcined hydrotalcite which has a formula $M^{2+}_{1-x}M^{3+}_{x}O_{1+x/2}$, where 0<x≤0.33, $M^{2+}$ are divalent Mg, Mn, Fe, Co, Ni, Cu and Zn metal ions, and $M^{3+}$ are trivalent Al, Fe, Cr, Co and In metal ions.

7. The purification system according to claim 1, wherein the water adsorbent is synthetic zeolite or activated alumina.

8. A purification system for removing hydrogen fluoride and water from a non-aqueous electrolytic solution for a lithium ion secondary battery, comprising:
- a preliminary purifier for removing water containing an adsorbent for trapping water;
- a purifier for removing hydrogen fluoride connected downstream from the preliminary purifier, the purifier for removing hydrogen fluoride containing an adsorbent selected from carbonate hydrotalcites or calcined hydrotalcites; and
- a purifier for removing water connected downstream from the purifier for removing hydrogen fluoride, the purifier for removing water containing a water adsorbent,
- each purifier comprising a housing, an electrolytic solution inlet member, an electrolytic solution outlet member and mesh for preventing outflow of the adsorbent at the inlet and outlet of the housing,
- wherein the non-aqueous electrolytic solution flows into the preliminary purifier via the electrolytic solution inlet member of the preliminary purifier, whereby the non-aqueous electrolytic solution is supplied to the adsorbent for trapping water; out of the preliminary purifier via the electrolytic solution outlet member of the preliminary purifier; into the purifier for removing hydrogen fluoride via the electrolytic solution inlet member of the purifier for removing hydrogen fluoride, whereby the non-aqueous electrolytic solution is supplied to the adsorbent selected from carbonate hydrotalcites or calcined hydrotalcites; out of the purifier for removing hydrogen fluoride via the electrolytic solution outlet member of the purifier for removing hydrogen fluoride; into the purifier for removing water via the electrolytic solution inlet member of the purifier for removing water, whereby the non-aqueous electrolytic solution is supplied to the water adsorbent; and out of the purifier for removing water via the electrolytic solution outlet member of the purifier for removing water.

9. The purification system according to claim 8, wherein the preliminary purifier reduces a concentration of water contained in a non-aqeuous electrolytic solution for a lithium ion secondary battery to 100 ppmw or less.

* * * * *